Sept. 20, 1949.  E. B. NOEL  2,482,430
PHOTOGRAPHIC LIGHTING UNIT
Filed Dec. 6, 1945

INVENTOR:
EDWARD B. NOEL,
BY John H Anderson
HIS ATTORNEY

Patented Sept. 20, 1949

2,482,430

UNITED STATES PATENT OFFICE 2,482,430

PHOTOGRAPHIC LIGHTING UNIT

Edward B. Noel, Cleveland Heights, Ohio, assignor to General Electric Company, a corporation of New York Application December 6, 1945, Serial No. 633,177

2 Claims. (Cl. 240—1.3)

My invention relates to lighting equipment and particularly to such equipment furnishing illumination for taking photographs.

Lighting equipment comprising a gaseous electric conduction tube for providing a flash of light for taking a photograph and an incandescent lamp for providing light to facilitate focusing the camera before taking the photograph is disclosed in the United States Patents 2,277,697 and 2,277,698, which issued March 31, 1942. The flash tube and the incandescent lamp are permanently combined in a single unit and their fields of illumination have approximately the same center in the patented structure so that by the light from the incandescent lamp the photographer may judge where the light from the flash tube will fall when the photograph is taken. In the copending application Serial No. 503,068, filed September 20, 1943, issued as Patent No. 2,469,607, on May 10, 1949, and assigned to the assignee of this application, Paul B. Davis and I have disclosed a similar unit in which the shorter-lived incandescent lamp may be replaced when it has become inoperative so that the more expensive and longer-lived flash tube may be used until the end of its life.

The size of the bulb of the incandescent lamp which may be used in such units is limited by the size of the flash tube which is as small as possible and is usually in the form of a helix surrounding the incandescent lamp bulb for mounting about the focus of a light concentrating reflector. This limitation on the bulb size restricts the size of the filament and thus limits the amount of light which may be produced by the incandescent lamp. Further, if the filament of the incandescent lamp produces too much heat the flash tube may mis-fire, that is, fail to start. Higher lighting intensities from the incandescent lamp are desirable in order to facilitate focusing the camera.

An object of my invention is to provide a lighting unit comprising a flash tube and an incandescent lamp which provides a higher level of illumination from the incandescent lamp for focusing the camera while retaining the advantages flowing from the same source positioning of the different types of illuminants. Another object of my invention is to provide such a lamp unit in which the size of the shorter-lived incandescent lamp is not limited by the flash tube. Further objects and advantages of the invention will appear from the following detailed description of species thereof and from the appended claims.

Figure 1:
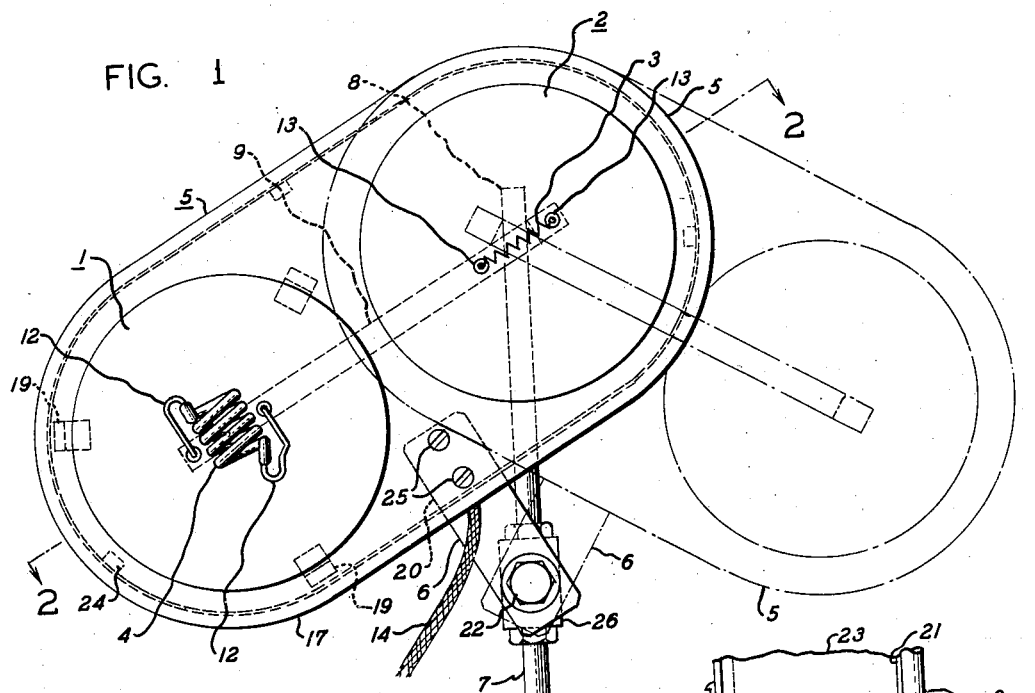
Figure 3:
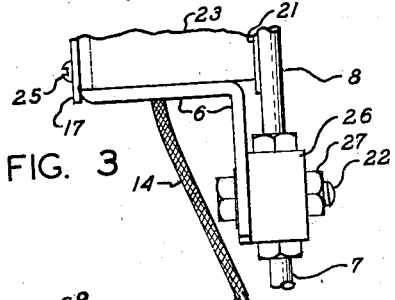
Figure 2:
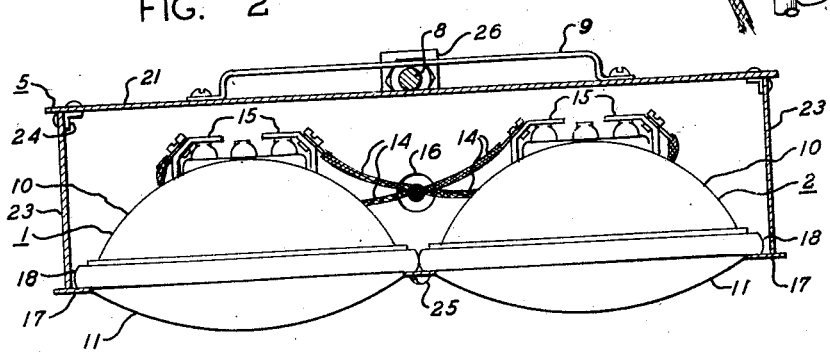

In the drawing accompanying and forming part of this specification an embodiment of the invention is shown in which Fig. 1 is a front elevational view of my new lighting unit; Fig. 2 is a sectional view taken along the line of 2—2 of Fig. 1 and showing the lamps in full, and Fig. 3 is a fragmentary side elevational view of part of the lighting unit.

As shown in the drawing the lighting unit comprises a pair of illuminants or lamps 1 and 2, one including an incandescent filament 3 and the other a flash tube 4. The lamps 1 and 2 are mounted side-by-side in an elongated, shallow, sheet metal holder or housing 5 which has a transversely extending bracket or arm 6 projecting outwardly from one of its sides and which is pivoted to a vertical supporting post or standard 7. The housing 5 thus may be tilted in either direction from a horizontal position to move either lamp 1 or 2 into position directly above the post 7. For example, the housing 5 may be moved from the position in which it is shown in full lines in Fig. 1 of the drawing with the incandescent lamp 2 centered above the post 7, to the position shown in light broken lines in Fig. 1 with the lamp 1 including the flash tube 4 centered above the post 7. The lamp unit also comprises means to hold or fix the housing 5 in position with either lamp 1 or lamp 2 centered above the post. This means, shown in Fig. 2, comprises a stationary rod 8 projecting upward from the top of the post and engaging a longitudinally extending strap 9 fastened to the back of the housing 5. The strap 9 is so positioned and of such length that the housing 5 may be tilted approximately 30° in either direction from the horizontal before the ends of the strap 9 engage the rod 8 to stop the movement and hold the housing 5 in proper position against the pull of gravity.

In using the lighting unit for taking photographs the housing 5 is tipped so that the incandescent lamp 2 is centered above the post 7, as shown in full lines in Fig. 1, and the lamp 2 is energized to illuminate the subject to be photographed. The incandescent lamp 2 may be of relatively high wattage, this is, 300 watts or more, to provide adequate and continuous illumination for focusing the camera. After the camera has been focused the housing 5 may be tipped in the opposite direction to move the lamp 1 comprising the flash tube 4 into exactly the same position previously occupied by the incandescent lamp 2. The housing 5 will then be in the position shown in light broken lines in Fig. 1. The flash tube 4 may then be energized to provide a bright flash of light for taking the picture. The incandescent lamp 2 may be kept burning after the housing 5 has been tipped to move the flash tube 4 into position directly above the post 7 and until the picture has been taken so as to judge the expression of the person being photographed.

The incandescent lamp may be of the type disclosed in the U. S. Patent 2,324,972, issued July 20, 1943, and the lamp including the flash tube may be of the type disclosed in my copending application Serial No. 561,974, filed November 4, 1944, issued as Patent Number 2,392,828 on January 15, 1946, and assigned to the assignee of this application. Both lamps 1 and 2 comprise a sealed glass envelope having a rear concave reflector portion 10 and a front radiation-transmitting cover portion 11 which is also slightly concave and is fused at its periphery to the rear portion. The reflecting surface on the rear portion 10 may be a paraboloid to direct the light through the cover portion. The filament 3 and the helically coiled flash tube 4 may be mounted at the focus of the reflector of the respective lamps and are supported by the current connectors 12, 12 and 13, 13 respectively which may be secured hermetically tight to the rear portion of the lamps as described in the Wright Patent No. 2,324,972.

Electric energy is supplied to the lamps by insulated wires 14 fastened to the terminals 15 of the lamps 1 and 2 and passing through an opening 16 in the bottom of the housing 5 (Fig. 2) for connection to a suitable electric power source. Arm 6 has a similar opening in registry with opening 16 for accommodating wires 14. The auxiliary electrical equipment for operating the flash tube 4 may be housed in the floor or table stand (not shown) to which the supporting post 7 may be fastened. Suitable switches for controlling the energization of the lamps 1 and 2 may be provided on the stand or the post 7.

The concave cover portions 10 of the lamps project through openings in the front plate 17 of the sheet metal housing and the lamps have annular shoulders 18 which engages the plate 17 at the edges of the openings. The lamp shoulders 18 are also engaged by spring clips 19 (shown in dotted lines in Fig. 1) which may be bolted to the front plate 17 to hold the lamps 1 and 2 against the plate 17. The arm 6 pivotally supporting the housing 5 has an upturned end 20 which is bolted to the inside of the front plate 17 between the lamps 1 and 2 (Fig. 1). As shown in Fig. 3 the arm 6 extends underneath the housing 5 toward the back plate 21 and turns downward to engage the pivot bolt or pin 22 on the post 7. The main body portion 23 of the housing 5 is secured to the front plate 17 by conventional right angle strips 24 which may be bolted to these housing parts. The back plate 21 of the housing 5 may be similarly fastened to the main body portion 23. The housing 5 may be removed from the post 7 for replacing the lamps 1 and 2 by removing the two bolts 25 securing the front plate 17 to the arm 6 and lifting the housing 5. The front plate 17 and its attached lamps 1 and 2 may then be removed from the housing 5 for servicing or lamp replacement by taking out the bolts holding strips 24. The lamps 1 and 2 may be released from the plate 17 by removing clips 19.

The pivot pin 22 and the stop rod 8 are fastened to a pivot block 26 at the end of the support post 7. The pivot block 26 is threaded to engage the threaded lower end of the rod 8 and the pin 22. A lock nut 27 engages pin 22 (Fig. 3).

What I claim as new and desire to secure by Letters Patent of the United States is:

1. A photographic lighting unit comprising a support, a lamp housing having thereon a pair of illuminants including a continuous light source and a flash tube and being pivoted on said support with its center of gravity offset from its pivotal axis and movable to either side of said axis and engagement means on said housing engageable with said support to hold said housing with one of said illuminants in a predetermined position when the center of gravity of said housing is on one side of said axis and to hold said housing with the other of said illuminants in the same said predetermined position when the center of gravity of said housing is shifted to the other side of said pivotal axis.

2. A photographic lighting unit comprising a support, a lamp holder having thereon a pair of illuminants each comprising a sealed envelope having a light concentrating reflector portion mounted in side-by-side position on said holder with their reflectors facing in the same direction and including a continuous light source and a flash tube at the focus of their respective reflectors, said holder being pivoted on said support with its center of gravity offset from its pivotal axis and movable to either side of said axis and engagement means including a strap on said housing engageable with said support to hold said housing with one of said illuminants in a predetermined position when the center of gravity of said housing is on one side of said axis and to hold said housing with the other of said illuminants in the same said predetermined position when the center of gravity of said housing is shifted to the other side of said pivotal axis.

EDWARD B. NOEL.

REFERENCES CITED

The following references are of record in the file of this patent:

UNITED STATES PATENTS

| Number | Name | Date |
|---|---|---|
| 1,321,521 | Green | Nov. 11, 1919 |
| 1,667,366 | Weir et al. | Apr. 24, 1928 |

FOREIGN PATENTS

| Number | Country | Date |
|---|---|---|
| 656,570 | Germany | Feb. 9, 1938 |